(12) United States Patent
Meslioui

(10) Patent No.: US 11,591,958 B2
(45) Date of Patent: Feb. 28, 2023

(54) TURBOFAN ENGINE WITH ACOUSTIC TREATMENT

(71) Applicant: PRATT & WHITNEY CANADA CORP., Longueuil (CA)

(72) Inventor: Sid-Ali Meslioui, Brossard (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 400 days.

(21) Appl. No.: 16/784,328

(22) Filed: Feb. 7, 2020

(65) Prior Publication Data

US 2020/0392898 A1 Dec. 17, 2020

Related U.S. Application Data

(60) Provisional application No. 62/861,539, filed on Jun. 14, 2019.

(51) Int. Cl.
*F02C 7/045* (2006.01)
*F02C 7/24* (2006.01)

(52) U.S. Cl.
CPC ............... *F02C 7/045* (2013.01); *F02C 7/24* (2013.01); *F05D 2220/36* (2013.01); *F05D 2240/12* (2013.01); *F05D 2240/14* (2013.01); *F05D 2250/191* (2013.01); *F05D 2260/96* (2013.01); *F05D 2270/333* (2013.01)

(58) Field of Classification Search
CPC ..... F02C 7/045; F02C 7/24; B64D 2033/0206
See application file for complete search history.

(56) References Cited

U.S. PATENT DOCUMENTS

| | | | |
|---|---|---|---|
| 5,702,230 A | 12/1997 | Kraft et al. | |
| 6,619,913 B2 | 9/2003 | Czachor et al. | |
| 6,652,222 B1 | 11/2003 | Wojtyczka et al. | |
| 7,967,105 B2 * | 6/2011 | Tuan | B64D 33/02 244/1 N |
| 8,579,225 B2 * | 11/2013 | Mardjono | F02K 3/06 244/1 N |
| 9,127,452 B1 * | 9/2015 | Winfield | F02K 1/827 |
| 9,890,657 B2 | 2/2018 | Ali | |
| 10,371,173 B2 * | 8/2019 | Logue | F01D 25/04 |
| 2007/0012508 A1 | 1/2007 | Demers | |
| 2010/0243370 A1 * | 9/2010 | Tuan | F02C 7/045 181/214 |
| 2012/0085861 A1 * | 4/2012 | Mardjono | F02K 3/06 244/1 N |

(Continued)

FOREIGN PATENT DOCUMENTS

| | | |
|---|---|---|
| EP | 1860283 A2 | 11/2007 |
| EP | 3093450 A1 | 11/2016 |

OTHER PUBLICATIONS

European Patent Office, Communication dated Oct. 29, 2020 re: Application No. 20179833.7.

*Primary Examiner* — Sabbir Hasan
(74) *Attorney, Agent, or Firm* — Norton Rose Fulbright Canada LLP

(57) ABSTRACT

There is provided a turbofan engine having: a fan rotatable about an axis within a case; a first acoustic treatment lining a first portion of the case upstream of the fan; and a second acoustic treatment lining a second portion of the case downstream of the fan, the first acoustic treatment having different noise-attenuating characteristics relative to the second acoustic treatment.

15 Claims, 6 Drawing Sheets

(56) References Cited

U.S. PATENT DOCUMENTS

2014/0286748 A1     9/2014  Costa et al.
2016/0327064 A1 *  11/2016  Logue .................. F04D 29/526
2018/0148187 A1     5/2018  Valleroy et al.

* cited by examiner

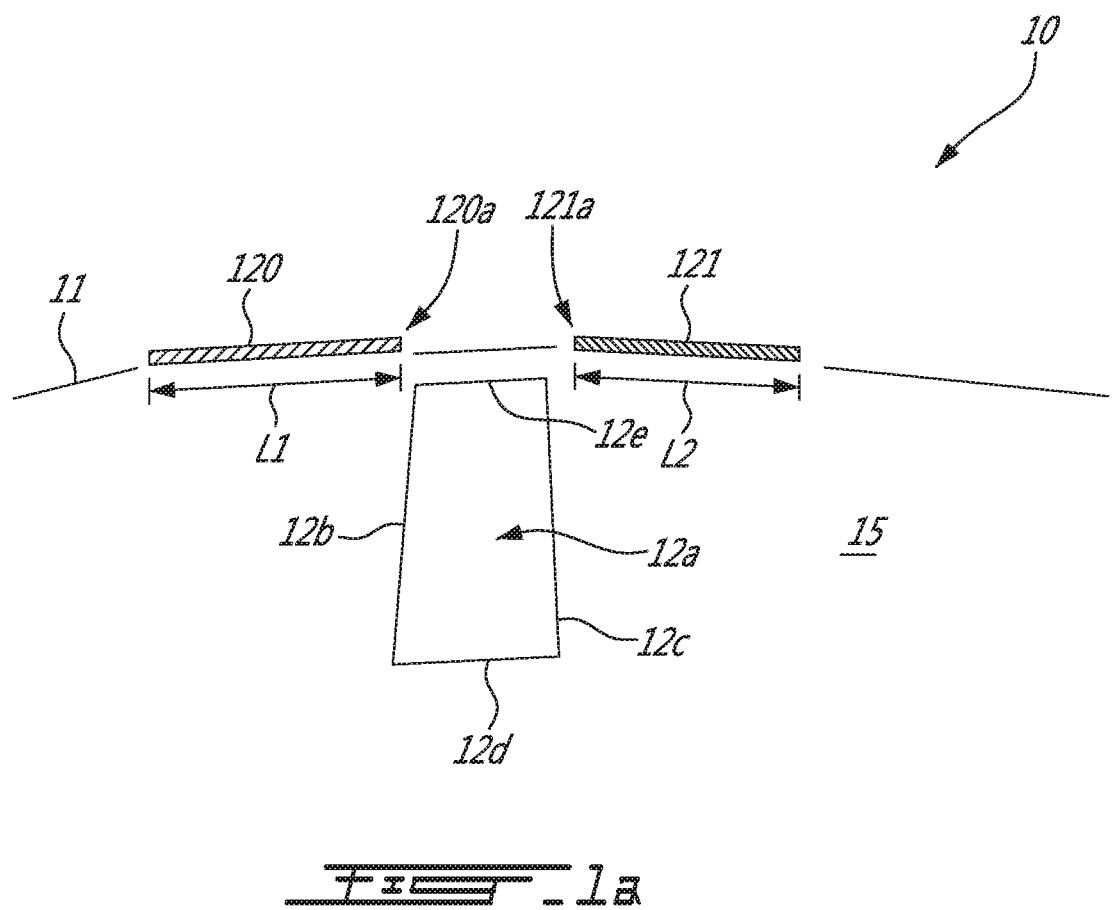

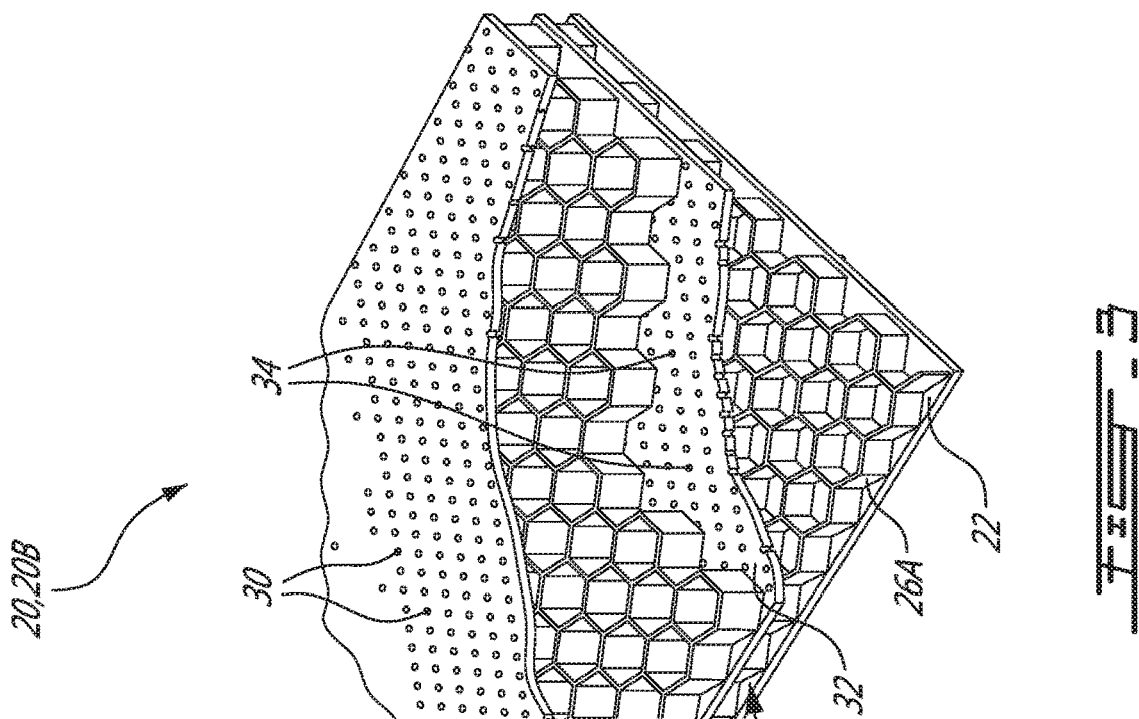
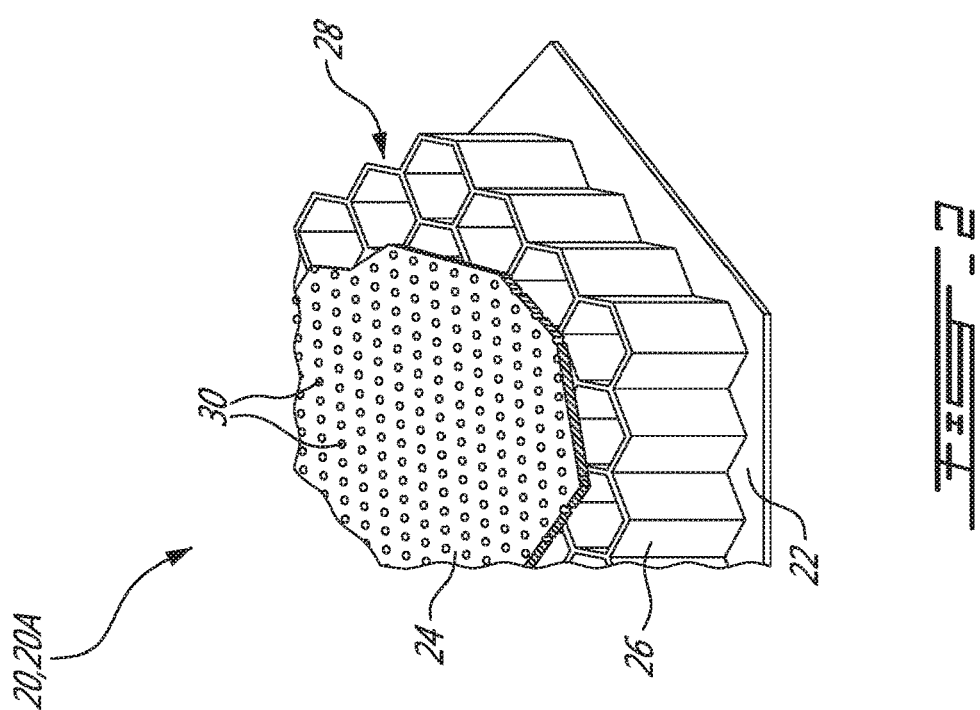

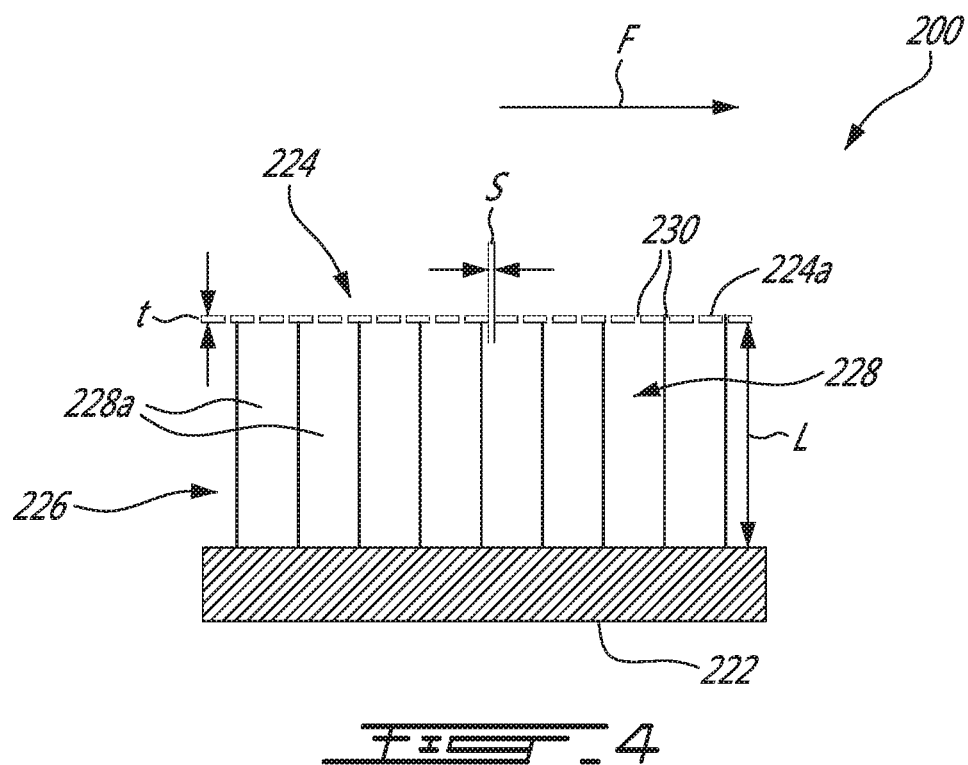
FIG. 4
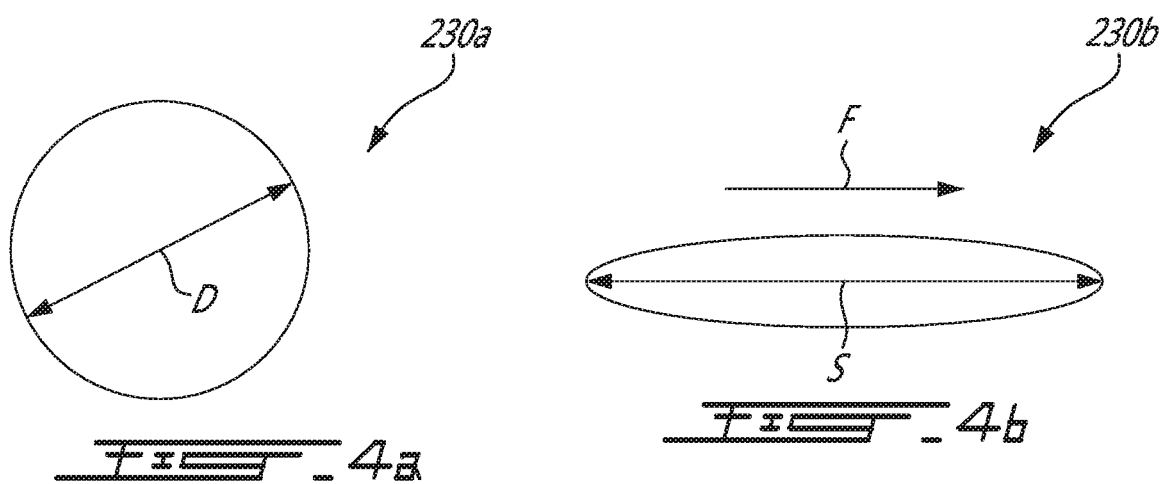
FIG. 4a
FIG. 4b

US 11,591,958 B2

TURBOFAN ENGINE WITH ACOUSTIC TREATMENT

CROSS REFERENCE TO RELATED APPLICATION AND CLAIM OF PRIORITY

The present application claims priority to U.S. provisional patent application No. 62/861,539 filed on Jun. 14, 2019, the entire contents of which are hereby incorporated herein by reference.

FIELD

This relates generally to aircraft, and more particularly to the noise-attenuating structures, components, and/or arrangements for aircraft engines.

BACKGROUND

A gas turbine engine is a major contributor to aircraft noise and acoustic treatments in the engine can be used to attenuate some of the noise. However, there are different sources of noise in a gas turbine engine and known configurations of acoustic treatment in gas turbine engines can have limitations in attenuating certain sources of noise. It would be desirable to enhance noise attenuation in gas turbine engines.

SUMMARY

In one aspect, the disclosure describes a turbofan engine comprising:
a fan rotatable about an axis within a case;
a first acoustic treatment lining a first portion of the case upstream of the fan; and
a second acoustic treatment lining a second portion of the case downstream of the fan, the first acoustic treatment having a different noise-attenuating characteristic relative to the second acoustic treatment.

In another aspect, the disclosure describes a method of attenuating noise in a turbofan engine having a fan rotatable about an axis within a fan case. The method comprises:
attenuating a first noise upstream of the fan; and
attenuating a second noise downstream of the fan, the first noise having a different characteristic relative to the second noise.

Other features will become apparent from the drawings in conjunction with the following description.

BRIEF DESCRIPTION OF DRAWINGS

In the figures which illustrate example embodiments,
FIG. 1a shows a schematic cross-sectional view of a portion of the engine of FIG. 1 and illustrating a possible configuration or arrangement of acoustic treatments;
FIG. 2 is a perspective cutaway view of an exemplary single degree of freedom (SDOF) acoustic panel that may be used in the configuration of acoustic treatments shown in FIG. 1a;
FIG. 3 is a perspective cutaway view of an exemplary double degree of freedom (DDOF) acoustic panel that may be used in the configuration of acoustic treatments shown in FIG. 1a;
FIG. 4 is a cross-sectional view of an exemplary acoustic treatment that may be used with the engine of FIG. 1;
FIGS. 4a and 4b illustrate exemplary shapes of perforations formed in the acoustic treatment of FIG. 4.

DETAILED DESCRIPTION

The following description relates to components (e.g., panels) of aircraft and arrangements of such components in fan casings and engines incorporating such components. The aircraft components described herein may be suitable for use on aircraft structure (i.e., airframes) or on aircraft engines for example. In various embodiments, the aircraft components described herein may serve structural and/or noise-attenuating functions. In various embodiments, the aircraft components disclosed herein may comprise or be part of walls, panels, liners or ducts for example. In some embodiments, the aircraft components disclosed herein may serve as acoustic treatment and may be referred to as "acoustic panels" or "acoustic liners" or "acoustic treatments" with desirable noise-attenuating characteristics and properties. Such aircraft components may be installed to line a duct (e.g., inlet duct and/or bypass duct) of a gas turbine engine to provide noise attenuation.

While the following description relates to acoustic treatment (e.g. panels) for aircraft applications, it is understood that such components may be suitable for use in other applications. In some embodiments, the components and methods disclosed herein may have unexpected noise attenuating properties resulting from particular dimensioning of components and/or arrangements of different components in particular locations.

Figure 1:
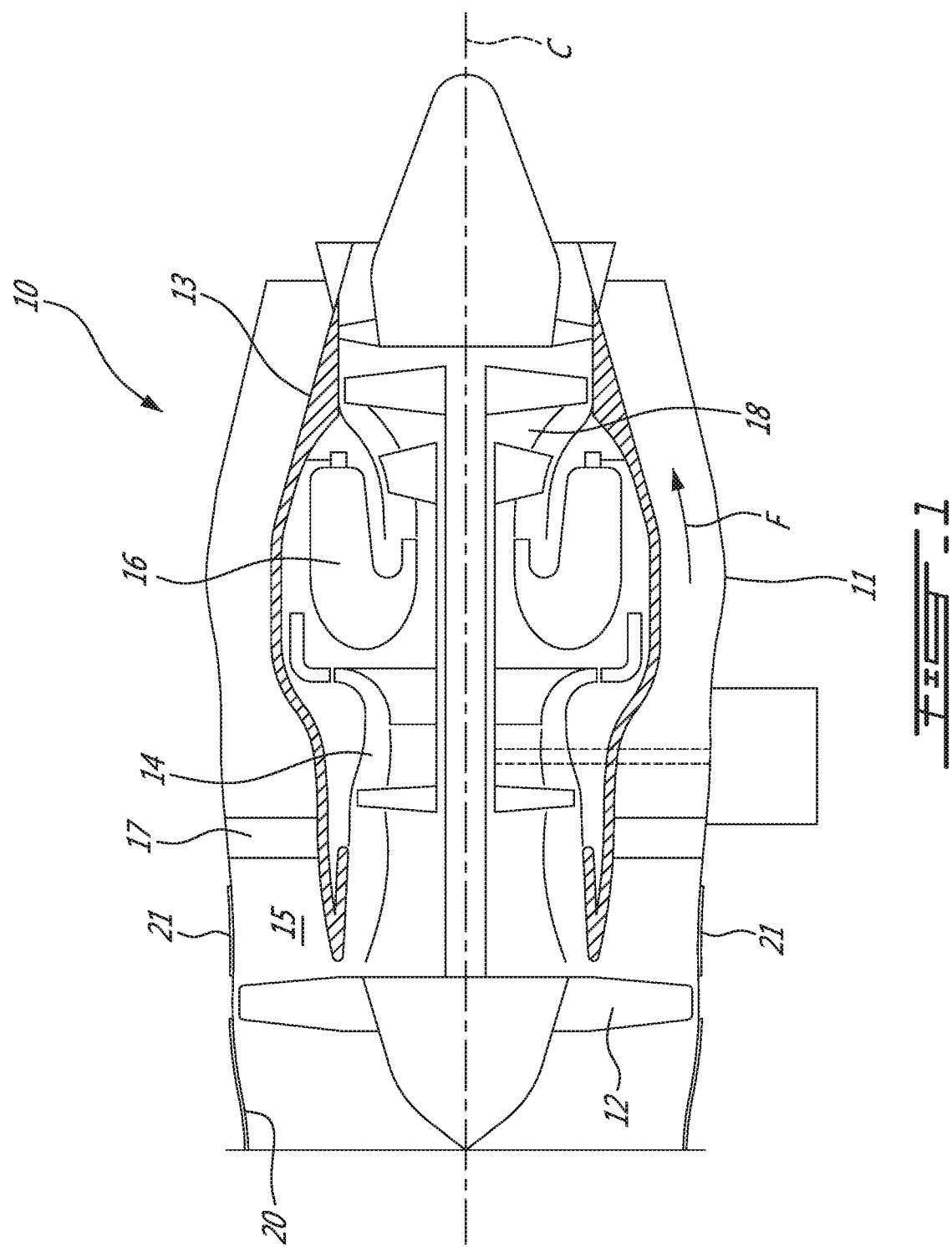
FIG. 1 shows a schematic cross-sectional view of a turbo-fan gas turbine engine.

FIG. 1 illustrates a gas turbine engine 10 of a turbofan type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating annular stream of hot combustion gases, and a turbine section 18 for extracting energy from the combustion gases. The fan 12, the multistage compressor 14, and the turbine section 18 are rotatable about a central axis C of the engine 10.

The engine 10 includes an outer case 11 and an inner case 13; a bypass conduit 15 being defined between the outer and inner cases 11, 13. Vanes, also referred to as stator or stator vanes, 17 may extend radially from the outer case 11 to the inner case 13 across the bypass conduit 15. The fan 12 of the engine 10 rotates about the central axis C within the outer case 11.

Gas turbine engine noise sources are mostly aeroacoustics in nature and are generated by rotating blades, interaction of turbulent structures, shear layers, jet expansions, and/or flow mixing, etc. The physics of the flow is quite complex and highly turbulent in areas such as downstream of the compressor/fan or a mixer. Therefore, mitigating noise by adding acoustic treatments exclusively designed to attenuate acoustic pressure waves has shown limitation at locations where turbulence dominate noise, like downstream of the fan where the rotating blades generate wakes that interact with stator vanes, thus responsible of generation of high broadband noise.

Engine 10 may comprise one or more components 20 used as acoustic treatment (e.g., panels or liners) disposed at different locations within engine 10 to obtain desired noise-attenuation. It is understood that component 20 may be used in other types of engines (e.g., turbo-shaft, turboprop, auxiliary power unit (APU)) and in other types of noise-attenuating applications. In various situations, one component 20 (e.g. an acoustic liner) may be disposed upstream of fan 12 inside an inlet duct of engine 10 such that noise being produced by fan 12 may be attenuated. In some embodiments, component 20 may be suitable for use in a fan case, intermediate case, bypass duct, exhausted duct, thrust reverser duct, exhaust bullet or center body of engine 10 for example. Depending on the specific application, component 20 may have a generally planar or arcuate form (e.g., of single or double curvature). Component 20 may be a structural or parasitic part of a duct of a nose cowl of engine 10. In various situations an aircraft component 21 (e.g. an acoustic liner) may be disposed downstream of fan 12 inside of engine 10 such that turbulence is damped with low resistance across component 21.

In some embodiments, components 20 and 21 are acoustic treatments. Different types of acoustic treatments are used in gas turbine engines. A single degree of freedom (SDOF) acoustic panel construction can include a honeycomb core disposed between a backing sheet and a porous (e.g. perforated) facing sheet. The space between the backing sheet and the facing sheet defines a noise attenuating cavity. A double degree of freedom (DDOF) acoustic panel construction can include two honeycomb cores joined together at an intermediate porous septum. The arrangement of the two honeycomb cores and the septum are disposed between a backing sheet and a facing sheet to define two noise attenuating cavities. SDOF and DDOF are described in more detail below with reference to FIGS. 2-3.

Referring to FIG. 1a, an arrangement of acoustic treatments for the gas turbine engine of FIG. 1 is shown. In the embodiment shown, two acoustic treatments, namely a first acoustic treatment 120 and a second acoustic treatment 121 are used. In a particular embodiment, to achieve engine/aircraft low noise target, fan noise propagating upstream and downstream may be substantially equally attenuated to be effective. The upstream fan noise characteristics or signature may be different than the downstream fan noise characteristics or signature. Different liner type and arrangement strategy may be adopted to maximize the noise reduction benefit. In the embodiment shown, the first and second acoustic treatments 120, 121 are configured to address fan forward noise and fan aft noise. The first and second acoustic treatments 120, 121 may allow to effectively achieve lower overall noise design of engine 10 compared to a configuration lacking such treatments. The first and second acoustic treatments 120, 121 may extend circumferentially all around the central axis C of the engine 10.

In the depicted embodiment, the first acoustic treatment 120 is located upstream of the fan 12 whereas the second acoustic treatment 121 is located downstream of the fan 12.

The fan 12 has blades 12a, only one shown in FIG. 1a. The blades 12a have leading edges 12b and trailing edges 12c extending from roots 12d to tips 12e thereof. The first and second acoustic treatments 120, 121 may be located respectively immediately upstream and immediately downstream of the fan 12.

More specifically, the leading edges 12b of the blades 12a may be axially aligned with a downstream end 120a of the first casing treatment 120 relative to the central axis C. The trailing edges 12c of the blades 12a may be axially aligned with an upstream end 121a of the second casing treatment 121. The leading edges 12b of the blades 12a at their tips 12e may be axially aligned with the downstream end 120a of the first casing treatment 120. The trailing edges 12c of the blades 12a at their tips 12e may be axially aligned with the upstream end 121a of the second casing treatment 121. The second acoustic treatment 121 may be located upstream of the vanes 17 (FIG. 1) that extend across the bypass conduit 15.

The first acoustic treatment 120 has a first axial length L1 taken along the central axis C of the engine 10 and the second casing treatment 121 has a second axial length L2 taken along said axis C. In a particular embodiment, the second axial length L2 of the second casing treatment 121 is greater than the first axial length L1 of the first acoustic treatment 120. In a particular embodiment, the greater the first and second axial lengths L1, L2 are, the better the noise attenuating capabilities of the first and second acoustic treatments 120, 121 may be. However, the axial lengths L1, L2 may be defined based on blade-off containment constraints for the first acoustic treatment 120 and de-icing zone or clearance for the second acoustic treatment 121.

The first acoustic treatment 120 may have a noise attenuating characteristic different than that of the second acoustic treatment 121. Herein, when a casing treatment is said to have a "noise attenuating characteristic" implies that said casing treatment is tailored to address a given noise source. A given "noise attenuating characteristic" may be associated with a given frequency, or a given frequency range, the casing treatment is tailored to address. A given "noise attenuating characteristic" may be associated with a given source of noise and/or with a given engine/aircraft power operating condition.

In the embodiment shown, the first casing treatment 120 is tuned to mitigate fan Multiple Pure Tones (MPT) noise generated by shockwaves at the tips 12e, or proximate the tips 12e, of the blades 12a of the fan 12 as a speed of said tips 12e, upon rotation of the fan 12 about the central axis C, may be supersonic. In some cases, the speed of the tips 12e of the blades 12a is supersonic during takeoff of an aircraft equipped with the engine 10 as a prime mover of said aircraft. For example, the speed of the tips 12e of the blades 12a may be supersonic during a major portion of a climb phase of the aircraft. The MPT may span over a wide frequency range due to the triggering of engine order tones. A broadband absorber liner strategy may be adopted using a double degree of freedom casing treatment (DDOF). A multiple degree of freedom casing treatment may be used as the first casing treatment 120. More detail about DDOF are presented herein below.

The second acoustic treatment 121 may be a Single Degree Of Freedom (SDOF) that may be tuned to mitigate rotor-stator interaction noise that typically occurs at all phases of a flight or power conditions. The second acoustic treatment 121 may target broadband and tonal noise. A SDOF treatment may be used with design emphases on broadband noise attenuation.

The second casing treatment 121 may have one or more degree(s) of freedom more than a number of degree(s) of freedom of the first casing treatment 120.

For attenuating the noise of the turbofan engine 10, a first noise upstream of the fan 12 is attenuated and a second noise downstream of the fan 12 is attenuated, the first noise and the second noise having different characteristics. The characteristics of the first and second noises may be, for instance, their frequencies, their frequency ranges, and/or their amplitudes. The first noise may have a wider frequency range than the second noise. The first noise may be caused by Multiple Pure Tones (MPT) whereas the second noise may be dominated by rotor-stator interaction. In a particular embodiment, the spectrum shows that the Blade Passing Frequency (BPF) tones mostly with broadband band noise due to turbulence.

Figure 5A:
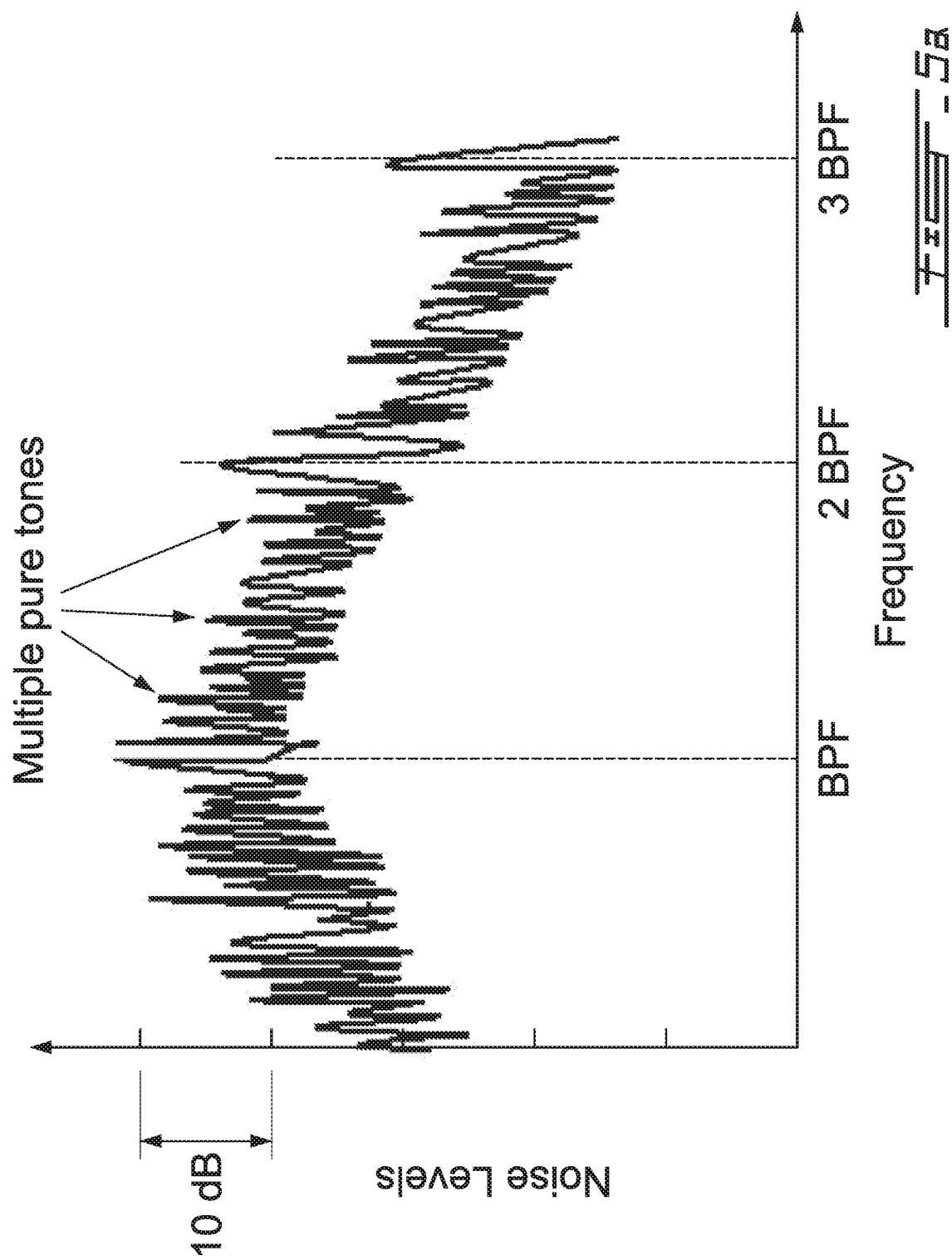
FIGS. 5a and 5b are spectrums respectively illustrating noise level versus frequency for noise generated forward of a fan of the gas turbine engine of FIG. 1 and aft of the fan.

As shown in FIG. 5a, the MPT occurring at the supersonic fan tip may be a substantial noise concern in part due to emergence of a multitude of tones in the spectrum. The first noise may have a frequency between 500 Hz and 4000 Hz.

Figure 5B:
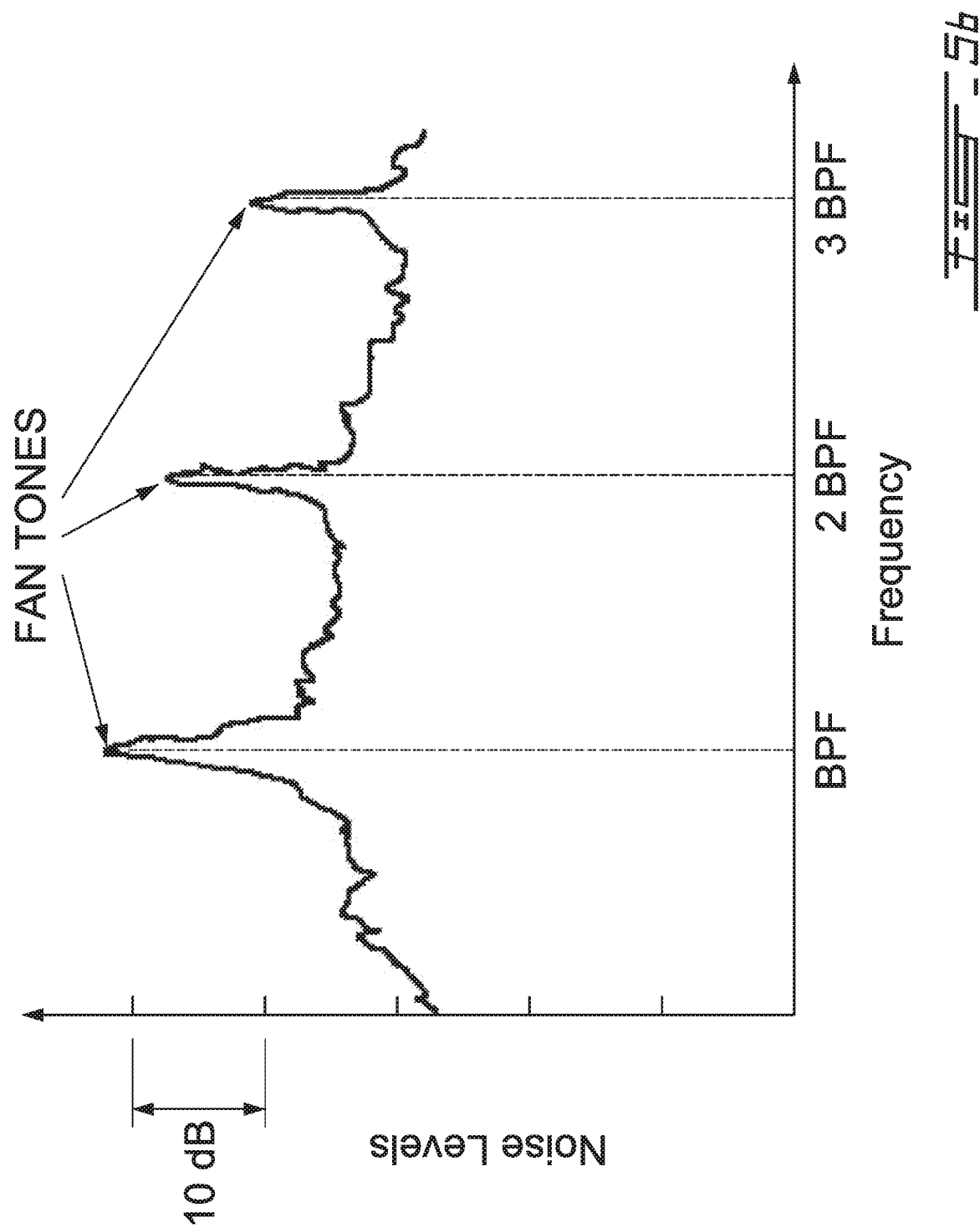

As shown in FIG. 5b, the spectrum shows the Blade Passing Frequency (BPF) tones associated with wakes of rotor blades interacting with stator vanes and the broadband band noise due to turbulence. The frequency of interest for noise reduction may span from 1000 Hz to 5000 Hz with emphasizes in addressing the frequency range when aircraft perceived noise penalty is the most severe, i.e. in the 2000 Hz to 4000 Hz. Stated differently, the second noise may have a frequency from 1000 Hz to 5000 Hz. In a particular embodiment, the second noise has a frequency from 2000 Hz and 4000 Hz due to Noys (perceived noisiness).

The first noise may originate from the tips 12e of the blades 12a of the fan 12. The second noise may originate from an interaction between the blades 12a of the fan 12 and the vanes 17 located downstream of the blades 12a.

FIG. 2 is a perspective cutaway view of an exemplary component 20 in the form of a single degree of freedom (SDOF) acoustic panel 20A. The exemplary component 20A may be used as the second casing treatment 121 of the arrangement of casing treatments described herein above with reference to FIG. 1a. SDOF acoustic panel 20A may comprise backing member 22, facing sheet 24 and cellular structure 26 (core) disposed between backing member 22 and facing sheet 24. Facing sheet 24 may be spaced apart from backing member 22 to define cavity 28 (e.g. a noise-attenuating cavity) between backing member 22 and facing sheet 24. When used with an aircraft engine, the facing sheet 24 may be configured to line a gas path portion of said engine having in use an airflow (e.g., flow F (FIG. 1)) passing over the facing sheet 24. As explained below, cellular structure 26 may be attached to backing member 22 and/or facing sheet 24. Cellular structure 26 may comprise walls serving as partitions defining sub-cavities (cells) within noise-attenuating cavity 28. In some embodiments, backing member 22 may have the form of a sheet and may be referred to as a "backing sheet". However, it is understood that backing member 22 may be of any suitable shape. For example, backing member 22 may be a part of another component of engine 10 such as a wall of a bypass duct of engine 10 that provides a suitable back wall for noise-attenuating cavity 28.

Referring to FIGS. 1a and 2, the component 20A when used as the second casing treatment 121 of the arrangement discussed above with reference to FIG. 1a, includes the facing sheet 24, also referred to as a perforated sheet, the cellular structure 26 disposed radially outwardly of the facing sheet 24 relative to the central axis C, and the backing member 22 disposed radially outwardly of the cellular structure 26.

The facing sheet 24 may define a portion of the outer case 11 of the engine 10. In other words, the facing sheet 24 may be tangent the outer case 11 to avoid aerodynamic losses that may otherwise occur.

FIG. 3 is a perspective cutaway view of an exemplary component 20 in the form of a double degree of freedom (DDOF) acoustic panel 20B. The exemplary component 20B may be used as the first casing treatment 120 of the arrangement of casing treatments described herein above with reference to FIG. 1a. DDOF acoustic panel 20B may comprise backing member 22, septum 32, cellular structures 26A, 26B and facing sheet 24. Septum 32 may be spaced apart from backing member 22 to define cavity 28A (e.g. noise-attenuating cavity) between backing member 22 and septum 32. Cellular structure 26A may be disposed between backing member 22 and septum 32.

Facing sheet 24 may be spaced apart from septum 32 to define cavity 28B (e.g. noise-attenuating cavity) between septum 32 and facing sheet 24. Cellular structure 26B may be disposed between facing sheet 24 and septum 32. Due to its configuration, DDOF acoustic panel 20B may be configured to resonate and attenuate noise at multiple frequencies or within a wider frequency range than SDOF acoustic panel 20A.

In reference to the SDOF and DDOF acoustic panels 20A, 20B (referred to generally as component 20) of FIGS. 2 and 3, cellular structures 26A, 26B (referred to generally as cellular structure 26) may each comprise a plurality of open-ended juxtaposed cells of hexagonal or other (e.g. triangular, rectangular) cross-sectional profile. The walls defining the cells of cellular structure 26 may extend from backing member 22 to facing sheet 24 and may provide support for facing sheet 24. In the case of DDOF acoustic panel 20B, the walls defining the cells of cellular structure 26A may extend from backing member 22 to septum 32. In some embodiments, cellular structure 26 may be referred to as a "honeycomb" core. Cellular structure 26 may be made from a suitable non-metallic material (e.g. polymer), composite material (e.g. carbon fiber/resin matrix) or metallic (e.g. aluminum-based) material for example.

Outer facing sheet 24 may be porous (e.g. perforated) and may comprise a plurality of through holes 30 formed therein. Facing sheet 24 may be made from a suitable composite material (e.g. carbon fiber with resin or ceramic matrix) or metallic (e.g. aluminum-based) material. In various embodiments, facing sheet 24 may comprise a wire mesh construction and/or may comprise felt metal.

Backing member 22 is shown as being unperforated and comprises a non-porous impermeable sheet or other relatively hard material. Backing member 22 may be made from a suitable non-metallic material (e.g. polymer), composite material (e.g. carbon fiber/resin matrix) or metallic (e.g. aluminum-based) material for example.

Septum 32 may be a porous (e.g. perforated) sheet and may comprise a plurality of through holes 34 formed therein for acoustically coupling noise-attenuating cavities 28A, 28B together. Septum 32 may be made from a suitable non-metallic material (e.g. polymer), composite material (e.g. carbon fiber/resin matrix) or metallic (e.g. aluminum-based) material for example. In some embodiments, septum 32 may comprise a perforated sheet of similar or substantially the same construction as facing sheet 24.

Referring to FIGS. 1a and 3, the component 20B when used as the first casing treatment 120 of the arrangement discussed above with reference to FIG. 1a, includes the facing sheet 24, one of the cellular structures 26B disposed radially outwardly of the facing sheet 24, the septum 32, which is depicted as another perforated sheet, disposed radially outwardly of the one of the cellular structures 26B relative to the central axis C, the other of the cellular structures 26A disposed radially outwardly of the septum 32, and the backing member 22 disposed radially outwardly of the other of the cellular structure 26A.

The facing sheet 24 may define a portion of the outer case 11 of the engine 10. In other words, the facing sheet 24 may be tangent to the outer case 11 to avoid aerodynamic losses that may otherwise occur.

Referring back to FIG. 1, sources of noise in the gas turbine engine 10 are mostly aeroacoustics in nature generated by rotating blades of the fan 12, interaction of turbulent structures, shear layers and jet expansions and flow mixing, for instance. The physics of the flow is quite complex and highly turbulent in areas such as downstream of the compressor/fan or a mixer. In some cases, mitigating noise by adding acoustic treatments exclusively designed to attenuate acoustic pressure waves has shown limitation at locations where turbulence dominate noise, like downstream of the fan 12 where the rotating blades 12a may generate wakes that interact with the stator vanes 17, thus responsible of generation of high broadband noise.

Referring now to FIG. 4, a cross-sectional view of an exemplary acoustic treatment 200 is shown. In some embodiments, the acoustic treatment is a SDOF acoustic panel as described above with reference to FIG. 2 and which may have enhanced noise-attenuating properties, particularly with respect to turbulence generated broadband noise. As depicted, the acoustic treatment 200 has a backing member 222 spaced apart from the facing sheet 224 to define a cavity 228 there between. The acoustic treatment 200 may be located to face the bypass conduit 15 (FIG. 1) of the engine 10. The acoustic treatment 200 may be located downstream of the fan 12. The acoustic treatment 200 may be located upstream of the vanes 17 extending through the bypass conduit 15.

In the embodiment shown, a cellular structure 226 (core) is disposed within the cavity 228 between the backing member 222 and facing sheet 224. The cellular structure 226 may divide the cavity 228 in a plurality of sub-cavities 228a.

Facing sheet 224 has a thickness dimension t. The facing sheet 224 has a plurality of perforations 230 extending through the thickness t. The perforations 230 may extend perpendicularly to a face 224a of the facing sheet 224 or at any other suitable angle. Each perforations 230 in the facing sheet 224 has a transverse dimension, or an effective diameter, s. A distance L between the facing sheet 224 and the backing sheet 222 may be referred to herein as a depth of the noise-attenuating cavity 228.

Herein, the effective diameter (e.g., dimension s) of the perforations 230 through the facing sheet 224 are categorized as "effective" as they are taken in a general direction of a fluid flow F past the facing sheet 224. Herein, "general" in general direction relates to a global direction of the flow past the facing sheet 224. Turbulence may form vortices within the flow past the facing sheet 224 that may induce the flow to be locally directed in a direction different the remainder of the flow. The effective diameter s of the perforations 230 are not taken relative to the local directions of the flow but are taken relative to a global movement of the flow past the facing sheet 224. In the case of the facing sheet 224 defining a part of the outer case 11, the general direction of the flow is from the fan 12 to the turbine section 18 and is mainly axial relative to the central axis C of the engine 10 and may include a swirl flow component immediately downstream of the blades of the fan. Stated differently, the general direction of the flow past the facing sheet 224 may correspond to a major one of components of velocity vectors of the flow within the bypass conduit 15.

Referring to FIGS. 4 and 4a, in the case where the perforations 230 are circular holes 230a, the effective diameter s is a diameter D of the circular holes 230a.

Referring to FIGS. 4 and 4b, the perforations 230 may have other shapes, including non-circular shapes and oblong shapes such as slits 230b; the effective diameter s extending parallel to the flow F past the facing sheet 224.

In the embodiment shown, a ratio of the thickness t of the facing sheet 224 over the effective diameter s of the perforations 230 ranges from 0.1 to 0.3. In a particular embodiment, the ratio of the thickness t over the effective diameter s is greater than 0.1 and less than or equal to 0.22. In a particular embodiment, the ratio of the thickness t to over the effective diameter s is about 0.2.

In the embodiment shown, the distance L between the facing sheet 224 and the backing member 222 ranges from 1.27 cm to 3.8 cm. In the depicted embodiment, a percentage of total open area (POA) defined by the perforations 230 in a region, or portion, of the facing sheet 224 may be between 6% and 15%, preferably between 8% to 12%. The POA is defined as the sum of the areas of the perforations 230 divided by the total area of the facing sheet 224. For example, in a situation where the perforations 230 are of uniform size and shape, $POA = n*\pi*r^2/A$ where n is the number of perforations 230, r is the radius of each perforation 230 and A is the total area including the perforations 230.

The perforations 230 may be uniformly distributed on the facing sheet 224. The perforations 230 may be equidistantly spaced from one another. The factors influencing noise attenuation are the total area of the liner, the thickness t of the facing sheet 224, the diameter d of the perforations 230 (or the effective diameter s of the perforations 230), the depth L of the cavity, and the percentage of open area.

The distance L between the facing sheet 224 and the backing member 222 (e.g., depth of the core 226) is function of $\lambda/4$, where $\lambda$ is the wavelength of the target frequency. Since the noise generated by turbulence is broadband in nature thus covering a wider frequency range, the depth of the core 226 may be set to target the frequency band that has the highest weighting from aircraft-level noise contribution point of view to achieve the maximum noise reduction. In a particular embodiment, the depth of the core 226 ranges from 1.27 cm (0.5 inch) to 3.81 cm (1.5 inches).

In some embodiments, the acoustic treatment 200 disclosed herein with reference to FIG. 4 allows to dampen turbulence to mitigate noises generated by the gas turbine engine 10. Acoustic treatment 200 may allow to address turbulence length scales and intensity rather than acoustic pressure waves. The disclosed acoustic treatment 200 may allow to damp turbulence by providing low resistance across the perforations 230.

In a particular embodiment, advantageous noise-attenuating properties may be achieved by the casing treatment 200 when certain geometric parameters are satisfied. For example, conventional acoustic panels are designed to attenuate acoustic pressure waves. However, the attenuation of acoustic pressure waves may have limited acoustic performance at locations in engine 10 in which turbulence dominates noise. For example, downstream of the fan 12 (FIG. 1), where rotating blades 12a (FIG. 1) generate wakes that interact with stator vanes 17, high broadband noise is generated. Conventional acoustic panels sizing or design strategy may not be well-suited for attenuating high broadband noise turbulence generated. In a particular embodiment, the disclosed combination of liners strategically addresses noise sources and turbulence sources that cannot be effectively mitigated with conventional liner designs.

In some embodiments, the casing treatment 200 may be suitable for use in dampening turbulence responsible for broadband noise generation. In some embodiments, the casing treatment 200 may be particularly suitable for attenuating turbulence and/or other high broadband noise when the ratio of thickness t of facing sheet 224 divided by the diameter D of the circular holes 130a is less than or equal to 0.22. Contrastingly, typical SDOF acoustic panels require the ratio of thickness t to diameter D to be greater than 0.5 in order to attenuate noise generated by acoustic pressure waves effectively.

In some embodiments, the depth of the cavity 228 may be selected to attenuate a particular frequency range. The depth may be related to the target frequency to be attenuated by a ratio of $\lambda/4$, where $\lambda$ is the wavelength corresponding to the target frequency to be attenuated. In some embodiments, the depth L of cavity 228 may be set to target the frequency band of aircraft-level noise which has the highest weighting.

Of course, the above described embodiments are intended to be illustrative only and in no way limiting. The described embodiments are susceptible to many modifications of form, arrangement of parts, details and order of operation. For instance, the acoustic treatment may be part of the fan case structure (built-in) with specific acoustic definition. The invention is intended to encompass all such modification within its scope, as defined by the claims.

What is claimed is:

1. A turbofan engine comprising:
a fan rotatable about an axis within a case;
a first acoustic treatment lining a first portion of the case upstream of the fan; and
a second acoustic treatment lining a second portion of the case downstream of the fan, the first acoustic treatment having a different noise-attenuating characteristic relative to the second acoustic treatment,
wherein:
the first acoustic treatment is a double degree-of-freedom acoustic treatment; and
the second acoustic treatment is a single degree-of-freedom acoustic treatment.

2. The turbofan engine of claim 1, wherein the first acoustic treatment includes:
a first perforated sheet;
a first cellular structure disposed radially outwardly of the first perforated sheet;
a second perforated sheet disposed radially outwardly of the cellular structure;
a second cellular structure disposed radially outwardly of the second perforated sheet; and
a backing member disposed radially outwardly of the second cellular structure.

3. The turbofan engine of claim 1, wherein the second acoustic treatment includes:
a perforated sheet;
a cellular structure disposed radially outwardly of the perforated sheet; and
a backing member disposed radially outwardly of the cellular structure.

4. The turbofan engine of claim 1, wherein the second acoustic treatment is located upstream of vanes extending across a bypass duct of the turbofan engine.

5. The turbofan engine of claim 1, wherein both of the first acoustic treatment and the second acoustic treatment extend substantially completely around the axis.

6. The turbofan engine of claim 1, wherein:
the first acoustic treatment is disposed immediately upstream of the fan; and
the second acoustic treatment is disposed immediately downstream of the fan.

7. The turbofan engine of claim 1, wherein the second acoustic treatment has a greater axial length than the first acoustic treatment.

8. A method of attenuating noise in a turbofan engine having a fan rotatable about an axis within a fan case, comprising:
attenuating a first noise upstream of the fan with a double degree-of-freedom acoustic treatment; and
attenuating a second noise downstream of the fan with a single degree-of-freedom acoustic treatment, the first noise having a different characteristic relative to the second noise.

9. The method of claim 8, wherein the first noise has a wider frequency range than the second noise.

10. The method of claim 8, wherein the different characteristics include different frequency ranges.

11. The method of claim 8, wherein the first noise has a frequency between 500 Hz and 4000 Hz.

12. The method of claim 11, wherein the second noise has a frequency between 1000 Hz and 5000 Hz.

13. The method of claim 8, wherein the first noise originates from shock waves generated close to tips of blades of the fan.

14. The method of claim 8, wherein the second noise originates from an interaction between blades of the fan and vanes located downstream of the blades.

15. The method of claim 8, comprising:
attenuating the first noise immediately upstream of the fan; and
attenuating the second noise immediately downstream of the fan.

* * * * *